United States Patent
Yoo et al.

(10) Patent No.: US 10,483,552 B2
(45) Date of Patent: Nov. 19, 2019

(54) CATALYST COMPRISING COBALT CORE AND CARBON SHELL FOR ALKALINE OXYGEN REDUCTION AND METHOD FOR PREPARING THE SAME

(71) Applicant: KOREA INSTITUTE OF SCIENCE AND TECHNOLOGY, Seoul (KR)

(72) Inventors: Sung Jong Yoo, Seoul (KR); Jue-hyuk Jang, Seoul (KR); So Young Lee, Seoul (KR); Jin Young Kim, Seoul (KR); Jong Hyun Jang, Seoul (KR); Hyoung-Juhn Kim, Seoul (KR); Namgee Jung, Seoul (KR); Hyun Seo Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/910,304

(22) Filed: Mar. 2, 2018

(65) Prior Publication Data

US 2018/0254490 A1 Sep. 6, 2018

(30) Foreign Application Priority Data

Mar. 6, 2017 (KR) .................. 10-2017-0028255

(51) Int. Cl.
*H01M 4/90* (2006.01)
*H01M 4/88* (2006.01)
(Continued)

(52) U.S. Cl.
CPC ............ *H01M 4/9041* (2013.01); *B01J 21/18* (2013.01); *B01J 23/75* (2013.01); *H01M 4/88* (2013.01)

(58) Field of Classification Search
CPC .... H01M 4/88; H01M 4/9041; H01M 4/9083; B01J 21/18; B01J 21/185; B01J 23/75
See application file for complete search history.

(56) References Cited

U.S. PATENT DOCUMENTS

| 7,053,021 B1 * | 5/2006 | Zhong | B22F 1/0018 502/185 |
| 2010/0062929 A1 * | 3/2010 | Virkar | B01J 23/40 502/304 |

(Continued)

FOREIGN PATENT DOCUMENTS

| KR | 10-2016-0022353 A | 2/2016 |
| KR | 10-2016-0038067 A | 4/2016 |
| KR | 10-2016-0122009 A | 10/2016 |

OTHER PUBLICATIONS

Supporting information of Yu (Cobalt Oxide and Cobalt-Graphitic Carbon Core-shell Based Catalysts with Remarkably High Oxygen Reduction Reaction Activity, Advanced Science (2016), issue 3, 1600060).*

(Continued)

*Primary Examiner* — Jun Li
(74) *Attorney, Agent, or Firm* — Rabin & Berdo, P.C.

(57) ABSTRACT

A catalyst containing a carbon support and a core-shell nanoparticle supported on the carbon support, wherein a core of the core-shell nanoparticle is cobalt metal not containing a heterogeneous element and the shell contains carbon. The catalyst for an oxygen reduction reaction of the present disclosure is a catalyst in which the cobalt core-carbon shell nanoparticle is supported on the carbon support through ligand stabilization and heat treatment. The catalyst can be synthesized to have high dispersibility. In particular, it can be used as an electrode catalyst of a cathode to improve the oxygen reduction activity and durability of a fuel cell operating under an alkaline atmosphere.

6 Claims, 9 Drawing Sheets

(51) Int. Cl.
*B01J 23/75* (2006.01)
*B01J 21/18* (2006.01)

(56) References Cited

U.S. PATENT DOCUMENTS

| | | | | |
|---|---|---|---|---|
| 2010/0086832 A1* | 4/2010 | Lopez | ................... | B22F 1/0018 |
| | | | | 429/409 |
| 2011/0129763 A1* | 6/2011 | Lee | ........................ | B22F 1/025 |
| | | | | 429/532 |
| 2012/0135862 A1* | 5/2012 | Hwang | .................. | B82Y 30/00 |
| | | | | 502/339 |
| 2012/0258854 A1* | 10/2012 | Kawamura | ......... | H01M 4/9083 |
| | | | | 502/177 |
| 2015/0202598 A1* | 7/2015 | Kallesoe | ............... | H01M 4/926 |
| | | | | 429/524 |

OTHER PUBLICATIONS

Jie Yu et al., "Cobalt Oxide and Cobalt-Graphitic Carbon Core-Shell Based Catalysts with Remarkably High Oxygen Reduction Reaction Activity", Adv. Sci., 2016, pp. 1600060 (p. 1-8), vol. 3.

Y. Wang et al., "Unification of catalytic oxygen reduction and hydrogen evolution reactions: highly dispersive Co nanoparticles encapsulated inside Co and nitrogen co-doped carbon", Chem. Commun., 2015, pp. 8942-8945, vol. 51.

\* cited by examiner

CATALYST COMPRISING COBALT CORE AND CARBON SHELL FOR ALKALINE OXYGEN REDUCTION AND METHOD FOR PREPARING THE SAME

CROSS-REFERENCE TO RELATED APPLICATIONS

This application claims, under 35 U.S.C. § 119, the priority of Korean Patent Application No. 10-2017-0028255 filed on Mar. 6, 2017 in the Korean Intellectual Property Office, the disclosure of which is incorporated herein by reference in its entirety.

TECHNICAL FIELD

The present disclosure relates to a catalyst for an alkaline oxygen reduction reaction and a method for preparing the same, more particularly to an electrode catalyst for oxygen reduction used in an energy conversion device, particularly to a non-platinum catalyst for an oxygen reduction reaction of a fuel cell using a polymer electrolyte membrane and a method for preparing the same.

BACKGROUND

A fuel cell is a device that convers chemical energy into electrical energy. It is a clean energy source which allows for utilization of energy with high efficiency as compared to the existing internal-combustion engines and does not emit pollutants such as carbon dioxide, nitrogen oxides, sulfur oxides, etc. during the energy conversion process. In a fuel cell, a gaseous fuel such as hydrogen, etc. is supplied to an anode and a gaseous fuel such as oxygen, etc. is supplied to a cathode. At the anode, hydrogen is oxidized and electrons are released via an external circuit connected to the fuel cell. At the cathode, ions are generated as oxygen is reduced by the released electrons. The ions are delivered through a polymer electrolyte membrane present between the anode and the cathode. Electrical energy is produced as this process is repeated.

In order to overcome the low oxygen reduction reaction activity leading to high overvoltage at the cathode, platinum or a platinum-based catalyst having high activity is commonly used as an electrode catalyst in the existing fuel cell. At present, low-platinum or non-platinum catalysts are studied actively to overcome the high price and limited supply of Pt. In particular, for catalysts used in alkaline fuel cells, non-platinum transition metal catalysts and carbon-based catalysts are studied actively due to their high oxygen reduction reaction activity and durability.

The previous researches on non-platinum and carbon-based oxygen reduction catalysts have been mainly focused on binding with a heterogeneous element such as nitrogen, phosphorus, etc. to exhibit oxygen reduction activity. These non-platinum oxygen reduction catalysts have the problem of low durability after operation for a long time and the carbon-based catalysts are problematic in that heat treatment is necessary for binding with the heterogeneous element at high temperature and in that the quantity of the bound heterogeneous element is also limited. Accordingly, development of a catalyst which is capable of exhibiting high oxygen reduction reaction activity and durability without binding with a heterogeneous element is necessary.

REFERENCES OF THE RELATED ART

Patent Documents

Korean Patent Publication No. 10-2016-0022353.
Korean Patent Publication No. 10-2016-0038067.

SUMMARY

The present disclosure is directed to synthesizing a catalyst in which a cobalt core-carbon shell type nanoparticle is supported on a carbon support, which does not contain platinum and is not bound to a heterogeneous element, and providing the same as an electrode catalyst for an alkaline oxygen reduction reaction, which exhibits improved oxygen reduction reaction activity at a cathode of an alkaline fuel cell using a solid polymer electrolyte membrane as well as superior durability, and a method for preparing the same.

In an aspect, the present disclosure provides a catalyst containing a carbon support and a core-shell nanoparticle supported on the carbon support, wherein a core of the core-shell nanoparticle is cobalt metal not containing a heterogeneous element and the shell contains carbon.

The catalyst may be for an oxygen reduction reaction or an oxygen evolution reaction.

The core-shell nanoparticle may have a particle diameter of 4-13 nm.

The carbon shell of the core-shell nanoparticle may be formed as a single-layer or double-layer shell on the surface of the cobalt core.

The content of the cobalt metal may be 15-40 wt % of the total weight of the catalyst.

In another aspect, the present disclosure provides a fuel cell containing the catalyst.

In another aspect, the present disclosure provides a method for preparing a catalyst, including: (a) a step of preparing a dispersion by dispersing a carbon support in a solvent; (b) a step of preparing a mixture solution by mixing the dispersion with a cobalt precursor and a polymer ligand; (c) a step of preparing a catalyst precursor by heat-treating the mixture solution at a low temperature of 250-350° C. under an inert gas atmosphere; and (d) a step of preparing a catalyst containing a carbon support and a core-shell nanoparticle supported on the carbon support, wherein a core of the core-shell nanoparticle is cobalt metal not containing a heterogeneous element and the shell contains carbon, by heat-treating the catalyst precursor at a high temperature of 550-800° C. under an inert gas atmosphere.

The carbon support may be one or more selected from carbon black, graphite and carbon nanotube.

The solvent may be one or more selected from 1-octadecene, water, methanol, ethanol, propanol, butanol, toluene and ethylene glycol.

The cobalt precursor may be one or more selected from cobalt acetylacetonate, cobalt acetylacetate, cobalt acetate, cobalt halide, cobalt nitrate, cobalt hydroxide and cobalt carbonyl complex.

The polymer ligand may be oleylamine or oleic acid.

The heat treatment at a low temperature in the step (c) may be performed for 30 minutes to 3 hours.

The heat treatment at a high temperature in the step (d) may be performed for 30 minutes to 2 hours.

The catalyst for an oxygen reduction reaction of the present disclosure is a catalyst in which the cobalt core-carbon shell nanoparticle is supported on the carbon support through ligand stabilization and heat treatment. The catalyst can be synthesized to have high dispersibility. In particular, it can be used as an electrode catalyst of a cathode to improve the oxygen reduction activity and durability of a fuel cell operating under an alkaline atmosphere.

DETAILED DESCRIPTION OF EMBODIMENTS

Hereinafter, various aspects and exemplary embodiments of the present disclosure are described in more detail. Exemplary embodiments of the present disclosure will be described referring to the attached drawings, so that those of skill in the art to which the present disclosure belongs can easily carry out the present disclosure.

However, the following description is not intended to limit the present disclosure to specific exemplary embodiments and description about well-known elements will be omitted so as not to obscure the relevant details of the present disclosure.

The terms used in the present disclosure are used only to describe the specific exemplary embodiments and are not intended to limit the present disclosure. Unless the context clearly indicates otherwise, singular forms include plural forms as well. In the present disclosure, the terms "include/contain", "have", etc. specify the presence of stated features, numbers, steps, operations, elements or combinations thereof, but do not preclude the presence or addition of one or more other features, numbers, steps, operations, elements or combinations thereof.

Hereinafter, a catalyst of the present disclosure is described.

The catalyst of the present disclosure contains a carbon support and a core-shell nanoparticle supported on the carbon support, wherein a core of the core-shell nanoparticle is cobalt metal not containing a heterogeneous element and the shell contains carbon.

In the present disclosure, a heterogeneous element refers to an element such as nitrogen, phosphorus, etc.

The catalyst may be for an oxygen reduction reaction or an oxygen evolution reaction.

The core-shell nanoparticle may have a particle diameter of 4-13 nm, more specifically 5-10 nm, further more specifically about 7 nm.

The carbon shell of the core-shell nanoparticle may be formed as a single-layer or double-layer shell on the surface of the cobalt core. More specifically, a double-layer shell may be formed. Accordingly, the carbon shell may have a thickness of about 0.68 nm.

The content of the cobalt metal may be 15-40 wt %, more specifically 18-35 wt %, of the total weight of the catalyst.

The present disclosure also provides a fuel cell containing the catalyst described as a cathode catalyst.

Figure 1:
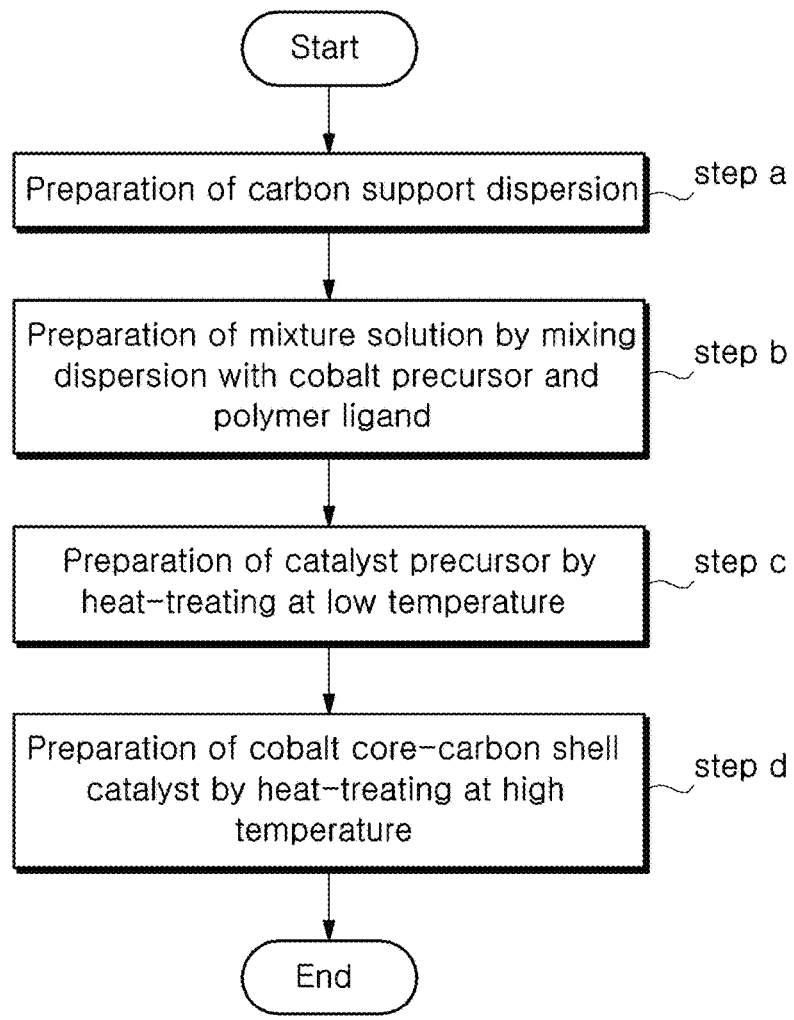
FIG. 1 is a flow chart describing a method for preparing a catalyst of the present disclosure.

FIG. 1 is a flow chart describing a method for preparing a catalyst of the present disclosure.

Hereinafter, the method for preparing a catalyst of the present disclosure is described referring to FIG. 1.

First, a dispersion is prepared by dispersing a carbon support in a solvent (step a).

The carbon support may be carbon black, graphite or carbon nanotube. However, without being limited thereto, any carbon material that may serve as a carbon support may be used in the present disclosure.

As the solvent, 1-octadecene, water, methanol, ethanol, propanol, butanol, toluene, ethylene glycol, etc. may be used. However, without being limited thereto, any solvent in which the carbon support can be dispersed uniformly may be used in the present disclosure.

Then, a mixture solution is prepared by mixing the dispersion with a cobalt precursor and a polymer ligand (step b).

The cobalt precursor may be cobalt acetylacetonate, cobalt acetylacetate, cobalt acetate, cobalt halide, cobalt nitrate, cobalt hydroxide, cobalt carbonyl complex, etc.

As the polymer ligand, oleylamine or oleic acid may be used.

Next, a catalyst precursor in which a polymer-coated cobalt oxide nanoparticle is supported on the carbon support is prepared by heat-treating the mixture solution at a low temperature of 250-350° C. under an inert gas atmosphere (step c).

The heat treatment at a low temperature may be performed specifically for 30 minutes to 3 hours, more specifically for 1-2 hours.

The catalyst precursor may have a structure in which a polymer is coated on the surface of a cobalt oxide core.

After the catalyst precursor is prepared, the solvent used for the dispersion may be removed by using a washing solvent and then the washing solvent may be evaporated.

Then, a catalyst is prepared by heat-treating the catalyst precursor at a high temperature of 550-800° C. under an inert gas atmosphere (step d).

The finally prepared catalyst is a catalyst containing a carbon support and a core-shell nanoparticle supported on the carbon support, wherein a core of the core-shell nanoparticle is cobalt metal not containing a heterogeneous element and the shell contains carbon.

The heat treatment at a high temperature may be performed specifically for 30 minutes to 2 hours, more specifically for 45 minutes to 2 hours.

EXAMPLES

Example 1

A dispersion was prepared by adding 0.1 g of carbon black (Vulcan XC-72) to 200 mL of a 1-octadecene solvent and then uniformly dispersing the carbon black in the solvent for 20 minutes using an ultrasonic homogenizer. Then, a mixture solution was prepared by adding 0.11 g of cobalt(II) acetylacetate ($Co(II)(acac)_2$) and 10 mL of oleylamine to the dispersion and then uniformly mixing the same for 20 minutes using an ultrasonic homogenizer. Then, a catalyst precursor was prepared by heat-treating the prepared mixture solution at a low temperature of 300° C. for 2 hours while flowing argon gas at a rate of 50 cc/min. Then, the 1-octadecene solvent was removed by using 500 mL of ethanol and 500 mL of hexane as a washing solvent. Next, a cobalt core-carbon shell non-platinum catalyst was prepared by completely removing the washing solvent by drying at 60° C. for 12 hours and then heat-treating the catalyst precursor at a high temperature of 600° C. for 1 hour while flowing argon gas at a rate of 100 cc/min.

Comparative Example 1

A catalyst was prepared in the same manner as in Example 1, except that heat treatment was not performed at a high temperature.

TEST EXAMPLES

Test Example 1

Transmission Electron Microscopic (TEM) Analysis

Figure 2A:
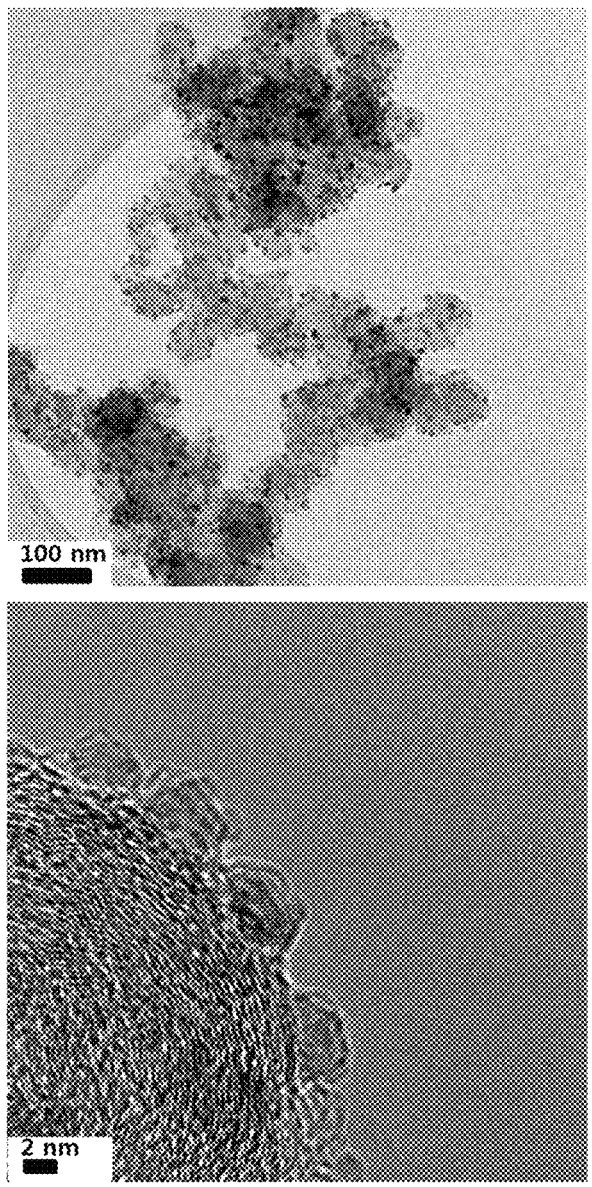
FIGS. 2A and 2B show transmission electron microscopic (TEM) images obtained in Test Example 1.
Figure 2B:
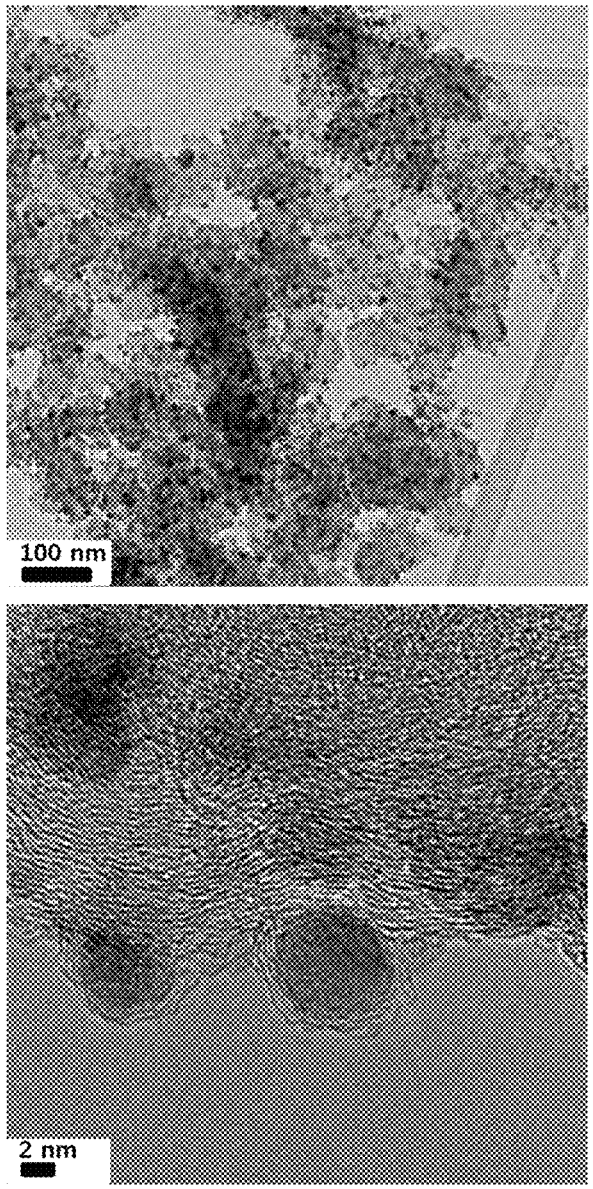

A small amount of the catalyst prepared in Example 1 or Comparative Example 1 was dispersed in ethanol and then applied uniformly on a carbon-coated copper grid. After completely removing the ethanol, the prepared catalyst sample was observed by transmission electron microscopy (TEM). The results are shown in FIGS. 2A and 2B. FIG. 2A shows the TEM images of the catalyst prepared in Comparative Example 1 and FIG. 2B shows the TEM images of the catalyst prepared in Example 1.

From FIGS. 2A and 2B, it can be seen that cobalt nanoparticles are uniformly dispersed on the carbon support. It can be seen that the catalyst of Comparative Example 1 contains cobalt nanoparticles with an average particle diameter of 3 nm and a polymer shell is formed on the surface. It can also be seen that the catalyst of Example 1 cobalt nanoparticles with an average particle diameter of 7 nm average particle diameter and a carbon shell is formed on the surface with a thickness of about 0.68 nm, indicating that the carbon shell consists of about two layers.

Test Example 2

X-ray Diffraction (XRD) Analysis

X-ray diffraction analysis was conducted to investigate the structure of the catalysts prepared in Example 1 and Comparative Example 1. Measurement was made in a range from 20-80 deg at a scanning rate of 0.2 deg/min. The 9B beam line of the Pohang Accelerator Laboratory was used for elucidation of the phase structure of the nanoparticle.

Figure 3:
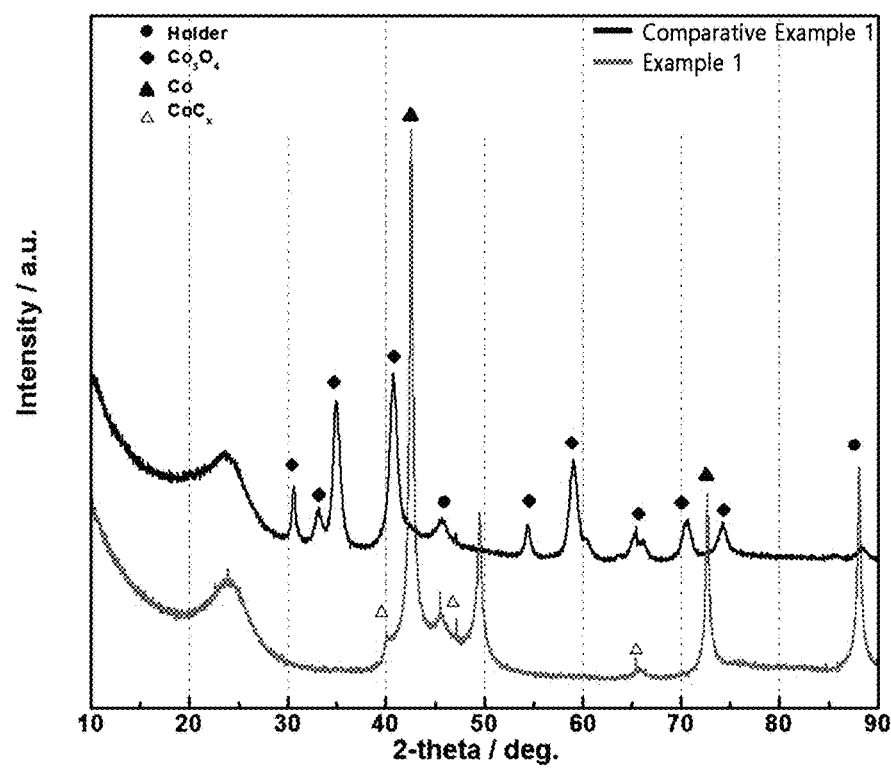
FIG. 3 shows an X-ray diffraction (XRD) analysis result obtained in Test Example 2.

The X-ray diffraction analysis result for the catalysts of Example 1 and Comparative Example 1 is shown in FIG. 3. From FIG. 3, it can be seen that, for the catalyst of Comparative Example 1 which was not heat-treated at a high temperature, cobalt was existing in the form of cobalt oxide ($Co_3O_4$). In contrast, for the catalyst of Example 1, which was heat-treated at a high temperature, the cobalt phase was converted to cobalt metal.

Test Example 3

X-ray Photoelectron Spectroscopic (XPS) Analysis

The surface structure of the catalysts prepared in Example 1 and Comparative Example 1 was analyzed by XPS. Measurement was made in a range from 0 to 680 eV for 50 cycles. Also, in order to confirm the removal of the amino (—$NH_2$) group of the oleylamine, measurement was made at 380-420 eV, which corresponds to N 1s, for 500 cycles. The 8A1 beam line of the Pohang Accelerator Laboratory was used for elucidation of the surface structure of the nanoparticle.

Figure 4:
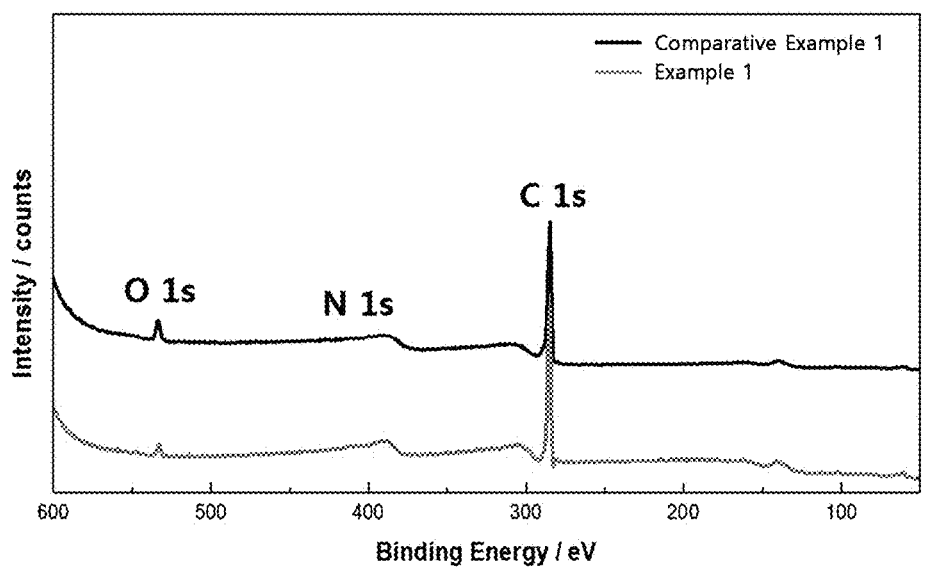
FIG. 4 and FIG. 5 show an X-ray photoelectron spectroscopic (XPS) analysis result obtained in Test Example 3.
Figure 5:
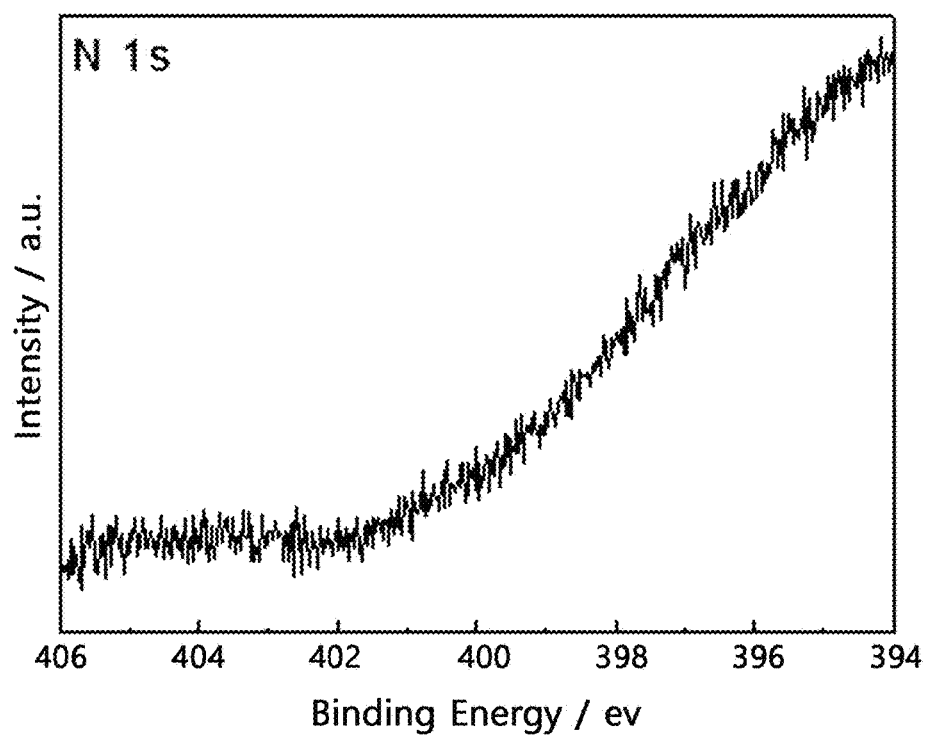

FIG. 4 and FIG. 5 show the XPS analysis result for the catalysts prepared in Example 1 and Comparative Example 1. From FIG. 4, it can be seen that carbon atoms are present in the carbon support and the carbon shell, whereas oxygen atoms are present on the carbon surface and in the atmosphere. From FIG. 5, it can be seen that the nitrogen atoms existing in the amino group of the oleylamine were completely removed. Accordingly, it can be seen that the catalyst prepared in Example 1 is free from binding with a heterogeneous element and the catalyst consists only of a cobalt metal and a carbon shell.

Test Example 4

Electrochemical Analysis: Half-cell Oxygen Reduction Reaction

The electrochemical properties of the catalysts prepared in Example 1 and Comparative Example 1 were measured at room temperature using a potentiostat and a three-electrode cell. A Pt wire was used as a counter electrode and an SCE (saturated 3 M KOH) was used as a reference electrode. A working electrode was prepared by polishing the surface of a rotating disk electrode (RDE, diameter 5 mm) containing glassy carbon with an alumina powder having a particle diameter of 0.05 μm and then washing the surface with distilled water and ethanol.

A catalyst ink was prepared by adding 630 μL of isopropyl alcohol and 5 μg of the catalyst to 50 μL of 5 wt % Nafion in isopropyl alcohol and uniformly dispersing the mixture in an ultrasonic homogenizer for 2 minutes.

10 μL of the catalyst ink was dropped onto the surface of the RDE and then dried at room temperature. The loading amount of the catalyst was set to 0.075 μg/cm$^2$. With the prepared working electrode, an oxygen reduction reaction activity curve was obtained in a range from 0.05 to 1.05 V by linear sweep voltammetry at a rate of 5 mV/s in an oxygen-saturated 0.1 M KOH solution. The result is shown in FIG. 6.

Figure 6:
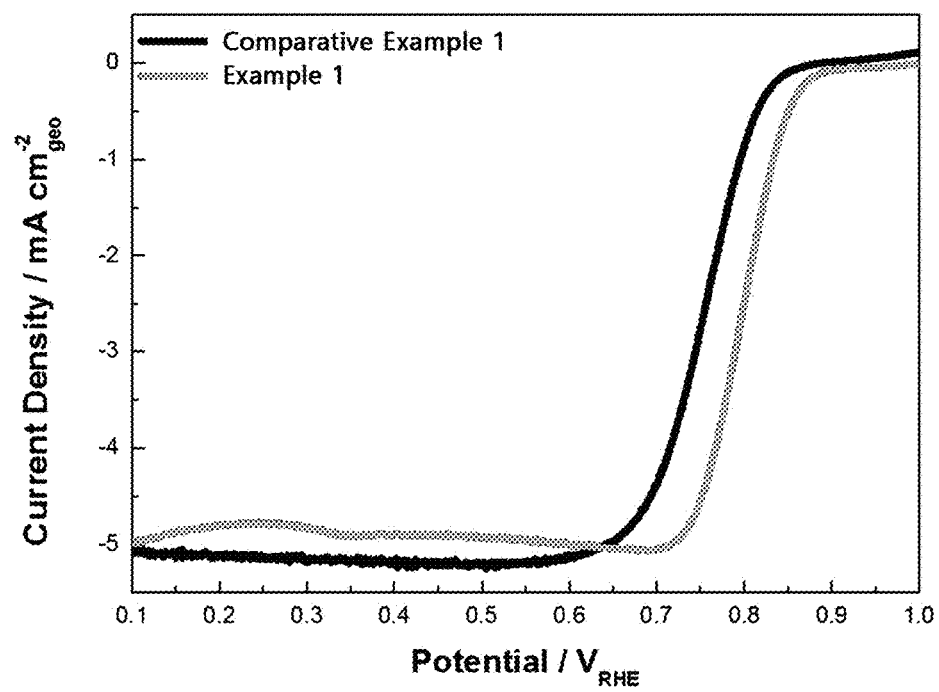
FIG. 6 shows a result of analyzing a half-cell oxygen reduction reaction analysis result obtained in Test Example 4.

From FIG. 6, it can be seen that the onset potential of the catalyst prepared in Example 1 for the oxygen reduction reaction was decreased to 0.89 $V_{RHE}$ as compared to that of the catalyst of Comparative Example 1. Also, it exhibited superior catalytic activity with a half-wave potential of 0.8 $V_{RHE}$. This demonstrates that the oxygen reduction reaction activity derives from the cobalt core and the carbon shell without binding to a heterogeneous element.

Test Example 5

Electrochemical Analysis: Half-cell Durability

The durability of a working electrode prepared in the same manner as in Test Example 4 was evaluated by cyclic voltammetry in a 0.1 M KOH solution at a rate of 100 mV/s for 5000 cycles. The result is shown in FIG. 7.

Figure 7:
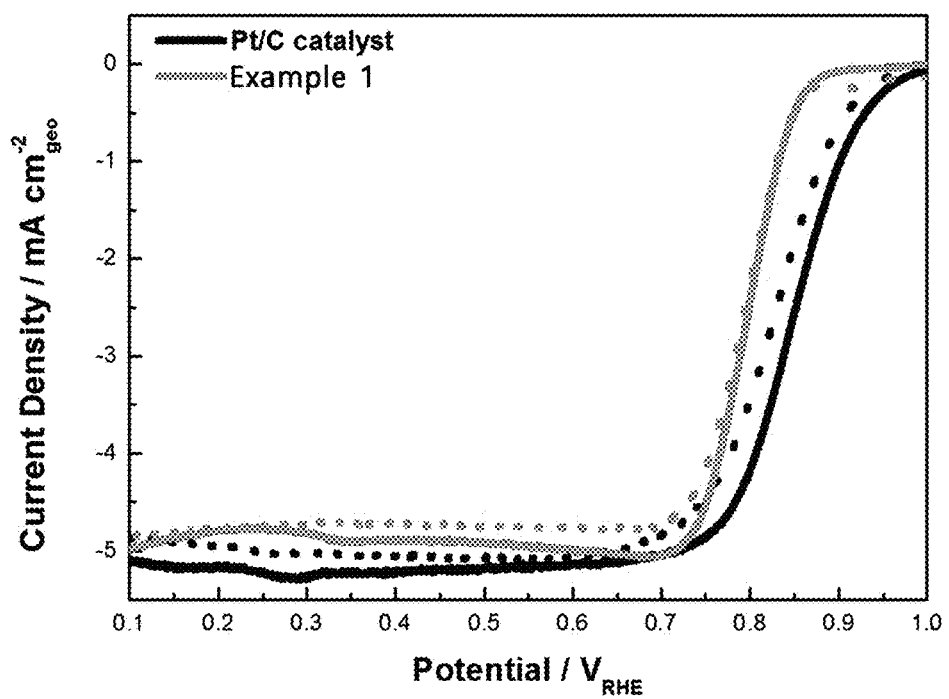
FIG. 7 shows a half-cell durability analysis result obtained in Test Example 5.

From FIG. 7, it can be seen that, for the commercially available platinum catalyst, the half-wave potential was decreased by 14 mV and the kinetic current at 0.8 V was decreased by about 50% from 20.72 mA/cm$^2$ to 10.34 mA/cm$^2$ after the 5000 cycles. For the catalyst prepared in Example 1, the half-wave potential was decreased by 2.9 mV and the kinetic current at 0.8 V was maintained almost constant from 4.72 mA/cm$^2$ to 4.18 mA/cm$^2$. As a result, it was confirmed that the catalyst of Example 1 exhibits superior durability under an alkaline atmosphere as compared to the existing commercially available catalyst.

Test Example 6

Electrochemical Analysis: Single-cell Oxygen Reduction Reaction

A cathode was prepared by coating the catalyst prepared in Example 1 with 0.4 mg/cm$^2$ using a commercially available solid alkaline electrolyte membrane (A201, Tokuyama) and a commercially available alkaline ionomer (I2, Acta s.p.a) and single-cell performance was evaluated under the condition of normal pressure, 60° C. and 100% relative humidity while flowing 200 cc/min of hydrogen gas to an anode and 200 cc/min of oxygen gas to a cathode. The result is shown in FIG. 8.

Figure 8:
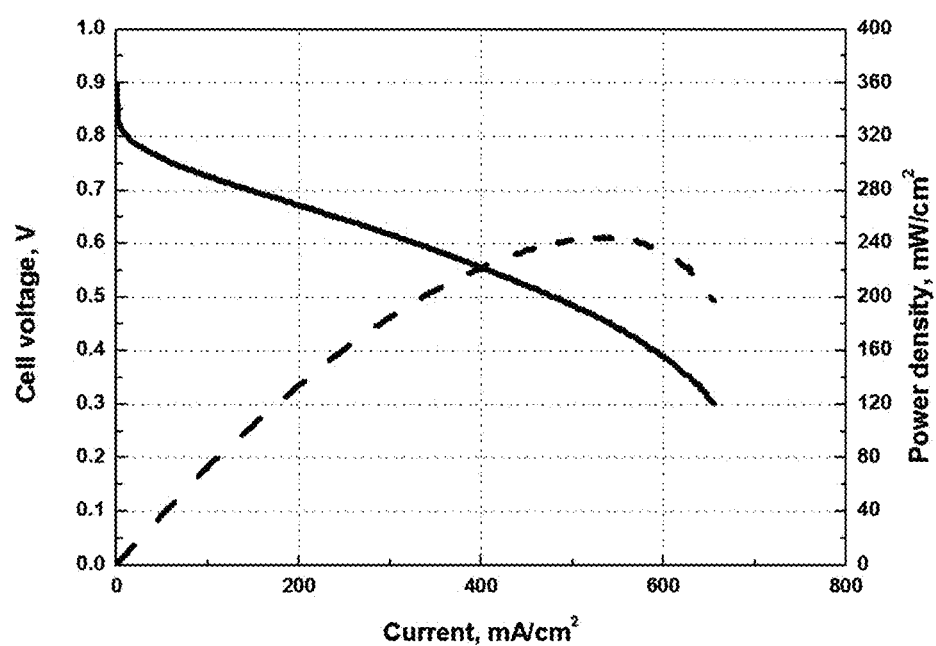
FIG. 8 shows a single-cell performance analysis result obtained in Test Example 6.

From FIG. 8, it can be seen that, for a single cell using the non-platinum catalyst prepared in Example 1, a high current density of 320 mA/cm$^2$ could be achieved at 0.6 V and the maximum power density was 243 mW/cm$^2$, indicating that a fuel cell using a solid alkaline electrolyte membrane with high performance could be prepared. In addition, the loading amount of the catalyst on the cathode was only 0.4 mg/cm$^2$, which is significantly decreased from the loading amount (0.5-3 mg/cm$^2$) of the existing non-platinum or carbon-based catalyst. When considering the maximum power density or current density per weight, it can be seen that the non-platinum catalyst prepared in Example 1 is very effective.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing a catalyst, consisting of:
   (a) preparing a dispersion by dispersing a carbon support in a solvent;
   (b) preparing a mixture solution by mixing the dispersion with a cobalt precursor and oleylamine;
   (c) preparing a catalyst precursor by heat-treating the mixture solution at a low temperature of 250-350° C. under an inert gas atmosphere, wherein an oleylamine-coated cobalt oxide nanoparticle is supported on the carbon support in the catalyst precursor; and
   (d) preparing a catalyst by heat-treating the catalyst precursor at a high temperature of 550-800° C. under the inert gas atmosphere, wherein the catalyst contains the carbon support and a core-shell nanoparticle supported on the carbon support,
   wherein the core of the core-shell nanoparticle is cobalt metal without having the heterogeneous element and the shell of the core-shell contains carbon.

2. The method for preparing a catalyst according to claim 1, wherein the carbon support is one or more selected from carbon black, graphite and carbon nanotube.

3. The method for preparing a catalyst according to claim 1, wherein the solvent is one or more selected from 1-octadecene, water, methanol, ethanol, propanol, butanol, toluene and ethylene glycol.

4. The method for preparing a catalyst according to claim 1, wherein the cobalt precursor is one or more selected from cobalt acetylacetonate, cobalt acetylacetate, cobalt acetate, cobalt halide, cobalt nitrate, cobalt hydroxide and cobalt carbonyl complex.

5. The method for preparing a catalyst according to claim 1, wherein the heat treatment at a low temperature in (c) is performed for 30 minutes to 3 hours.

6. The method for preparing a catalyst according to claim 1, wherein the heat treatment at a high temperature in (d) is performed for 30 minutes to 2 hours.

* * * * *